United States Patent
Hilbert et al.

(10) Patent No.: US 11,509,373 B2
(45) Date of Patent: Nov. 22, 2022

(54) SYSTEM AND METHOD FOR CONFIGURING A MULTI-MODE ANTENNA BASED ON NETWORK PERFORMANCE INDICATORS FOR A WIRELESS NETWORK

(71) Applicant: AVX Antenna, Inc., San Diego, CA (US)

(72) Inventors: Jeffrey L. Hilbert, Las Vegas, NV (US); Sebastian Rowson, San Diego, CA (US); Abhishek Singh, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 0 days.

(21) Appl. No.: 17/466,296

(22) Filed: Sep. 3, 2021

(65) Prior Publication Data
US 2022/0085857 A1    Mar. 17, 2022

Related U.S. Application Data

(60) Provisional application No. 63/077,070, filed on Sep. 11, 2020.

(51) Int. Cl.
*H04L 5/12*        (2006.01)
*H04B 7/06*        (2006.01)
*H04B 17/382*      (2015.01)

(52) U.S. Cl.
CPC ......... *H04B 7/0632* (2013.01); *H04B 7/0608* (2013.01); *H04B 17/382* (2015.01)

(58) Field of Classification Search
CPC ... H04B 7/0632; H04B 17/382; H04B 7/0608
USPC ................ 375/262, 260, 259, 295, 219, 316
See application file for complete search history.

(56) References Cited

U.S. PATENT DOCUMENTS

| | | | |
|---|---|---|---|
| 9,559,756 B2 * | 1/2017 | Desclos | ................... H01Q 3/00 |
| 2016/0080058 A1 | 3/2016 | Kang et al. | |
| 2017/0048141 A1 | 2/2017 | Kish et al. | |
| 2018/0352553 A1 | 12/2018 | Shtrom et al. | |
| 2018/0359710 A1 | 12/2018 | Desclos et al. | |
| 2019/0372644 A1 | 12/2019 | Chen et al. | |
| 2019/0386726 A1 | 12/2019 | Fresia et al. | |

* cited by examiner

*Primary Examiner* — Zewdu A Kassa
(74) *Attorney, Agent, or Firm* — Dority & Manning, P.A.

(57) ABSTRACT

A system for configuring a multi-mode antenna onboard one or more of a plurality of network devices on a wireless network is provided. The system includes one or more processors configured to obtain data indicative of a channel quality indicator associated with one or more antenna modes of a plurality of antenna modes in which the multi-mode antenna onboard one or more of the network devices is configurable. Each of the plurality of antenna modes can have a distinct radiation pattern. The one or more processors can be configured to determine one or more network performance indicators for the wireless network based on the data. The one or more processors can be configured to provide one or more control signals over the wireless network based on the one or more network performance indicators. The control signal(s) can be associated with reconfiguring an antenna mode of the multi-mode antenna.

20 Claims, 5 Drawing Sheets

SYSTEM AND METHOD FOR CONFIGURING A MULTI-MODE ANTENNA BASED ON NETWORK PERFORMANCE INDICATORS FOR A WIRELESS NETWORK

PRIORITY CLAIM

The present application claims the benefit of priority of U.S. Provisional App. No. 63/077,070, titled "System and Method for Configuring a Multi-Mode Antenna Based on Network Performance Indicators for a Wireless Network," having a filing date of Sep. 11, 2020, which is incorporated by reference herein.

FIELD

The present disclosure relates generally to network devices on a wireless network and, more particularly, to beam-steering a multi-mode antenna onboard one or more network devices based on network performance indicators for the wireless network.

BACKGROUND

Multi-mode antennas can be used in various applications. For example, multi-mode antennas can be used in smartphones to facilitate communication with other devices, such as other smartphones). Multi-mode antennas can be configurable in a plurality of antenna modes. Each of the plurality of antenna modes can have a distinct radiation pattern. Furthermore, one or more control devices can be configured to obtain data indicative of a channel quality indicator (CQI) while a multi-mode antenna is configured in each of the plurality of antenna modes. The one or more control devices can be configured to determine one of the plurality of antenna modes as a selected antenna mode for the multi-mode antenna based, at least in part, on the data indicative of the CQI associated with. In this manner, the multi-mode antenna can be configured in an antenna mode (e.g., the selected antenna mode) that provides an optimal or near optimal communication link between the multi-mode antenna and one or more remote devices (e.g., router, cell tower, etc.).

SUMMARY

Aspects and advantages of embodiments of the present disclosure will be set forth in part in the following description, or may be learned from the description, or may be learned through practice of the embodiments.

In one aspect, a system for configuring a multi-mode antenna onboard one or more of a plurality of network devices on a wireless network is provided. The system includes one or more processors configured to obtain data indicative of a channel quality indicator associated with one or more antenna modes of a plurality of antenna modes in which the multi-mode antenna onboard one or more of the network devices is configurable. Each of the plurality of antenna modes can have a distinct radiation pattern. The one or more processors can be configured to determine one or more network performance indicators for the wireless network based on the data. The one or more processors can be configured to provide one or more control signals over the wireless network based on the one or more network performance indicators. The control signal(s) can be associated with reconfiguring an antenna mode of the multi-mode antenna.

In another aspect, a method for configuring a multi-mode antenna onboard one or more of a plurality of network devices on a wireless network is provided. The method includes obtaining, via a network controller of the wireless network, data indicative of a channel quality indicator associated with one or more antenna modes of a plurality of antenna modes in which the multi-mode antenna onboard one or more network devices is configurable. Each of the plurality of antenna modes have a distinct radiation pattern. The method includes determining, via the network controller, one or more network performance indicators for the wireless network based, at least in part, on the data. The method includes providing, via the network controller, one or more control signals over the wireless network based, at least in part, on the one or more network performance indicators for the wireless network. The one or more control signals associated with reconfiguring an antenna mode of the multi-mode antenna onboard at least one of the plurality of network devices.

In yet another aspect, a computing device is provided. The computing device includes a multi-mode antenna configurable to operate in a plurality of antenna modes. Each antenna mode of the plurality of antenna modes has a distinct radiation pattern. The computing device includes one or more control devices. The one or more control devices are configured to configure the multi-mode antenna in each of the plurality of antenna modes. The one or more control devices are configured to obtain data indicative of a channel quality indicator while the multi-mode antenna is configured in each of the plurality of antenna modes. The one or more control devices are configured to provide, via a wireless network, data indicative of the channel quality indicator for one or more of the antenna modes to a network controller. The one or more control devices are configured to obtain, via the wireless network, one or more control signals from the network controller. The one or more control signals are associated with configuring the multi-mode antenna in a selected antenna mode of the plurality of antenna modes based, at least in part, on one or more network performance indicators that the network controller determined based, at least in part, on the data indicative of the channel quality indicator for the one or more antenna modes. The one or more control devices are configured to configure the multi-mode antenna in the selected antenna mode.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a system for controlling operation of a multi-mode antenna onboard one or more network devices based on one or more network performance indicators for a wireless network. The system can include a network controller. The network controller can be in communication with a plurality of network devices via the wireless network. The multi-mode antenna onboard one or more of the network devices can be configurable in a plurality of antenna modes. Each of the plurality of antenna modes can have a distinct radiation pattern. The network controller can be configured to obtain data from each of the plurality of network devices. In some implementations, the network controller can be configured to obtain the data based, at least in part, on an event. For instance, in some implementations, the event can correspond to an interval of time. Thus, in such implementations, the network controller can be configured to obtain the data based, at least in part, on the passage of the interval of time. In alternative implementations, the network controller can be configured to continuously obtain the data.

In some implementations, the data the network controller obtains from the network devices having the multi-modal antenna can be indicative of a channel quality indicator associated with one or more antenna modes of the plurality of antenna modes in which the multi-mode antenna is configurable. Alternatively, or additionally, each of the plurality of network devices can include one or more control devices configured to execute a software application (e.g., third-party software) stored on a memory device associated with each of the corresponding network devices. The software application can be configured to determine data indicative of performance of the corresponding network device. For instance, the one or more control devices executing the software application can be configured to detect violations of data limits set for the corresponding network device. As will be discussed below, the network controller can be configured to determine one or more network performance indicators for the wireless network based, at least in part, on the data obtained from each of the plurality of network devices.

In some implementations, the network controller can be configured to provide the data obtained from each of the plurality of network devices as an input to one or more machine-learned models. The one or more machine-learned models can be configured to process the data obtained from each of the plurality of network devices and output the one or more network performance indicators for the wireless network. The one or more network performance indicators for the wireless network can be indicative of performance of the wireless network as a whole. Examples of the one or more network performance indicators can include at least one of an uplink speed for each of the plurality of network devices over a period of time or a downlink speed associated with each of the plurality of network devices over the period of time. Alternatively, or additionally, the one or more network performance indicators can include data indicative of an amount of traffic on the wireless network over the period of time. In some implementations, the one or more network performance indicators can include a channel quality indicator (e.g., received signal strength indicator) associated with each link in the wireless network.

The network controller can be configured to provide one or more control signals to one or more of the network devices on the wireless network based, at least in part, on the one or more network performance indicators. For instance, in some implementations, the one or more network performance indicators can indicate an amount of traffic being routed through a first network device of the plurality of network devices exceeds a threshold at a given time of day (e.g., morning, afternoon, evening). In such implementations, the network controller can be configured to provide one or more control signals to one or more network devices other than the first network device. More specifically, if the one or more network devices have the multi-modal antenna, the one or more control signals can be associated with adjusting the antenna mode of the multi-mode antenna from a first antenna mode in which the radiation pattern of the multi-mode antenna is pointed toward the first network device to a second antenna mode in which the radiation pattern of the multi-mode antenna is no longer pointed towards the first network device. In this manner, the amount of traffic being routed through the first network device during the given time of day can be reduced to levels at or below the threshold and thereby improve performance of the wireless network.

In some implementations, the one or more network performance indicators can be a signal indicative of a maintenance action associated with network equipment of the wireless network. Examples of the network equipment can include an access point, a bridge, a hub, a network switch, the network controller, cabling (e.g., Ethernet cables), or any other type of equipment configured to facilitate communication between two or more nodes of the wireless network. In such implementations, the network controller can be configured to provide one or more control signals to the one or more network devices having the multi-modal antenna to switch an antenna mode of the multi-mode antenna from operating in a first antenna mode in which the multi-mode antenna is in communication with the network equipment to operating in a second antenna mode in which the multi-mode antenna is no longer in communication with the network equipment. In this manner, traffic on the network can be rerouted until the maintenance action is performed on the network equipment.

The system according to example aspects of the present disclosure can provide numerous technical benefits and advantages. For instance, providing the data (e.g., CQI values) associated with performance of the multi-mode antenna onboard each of the plurality of network devices to the network controller can improve the accuracy of the one or more network performance indicators the network controller determines for the wireless network. Furthermore, the network controller can determine an adjustment to the antenna mode of the multi-mode antenna onboard one or more of the network devices based, at least in part, on the one or more network performance indicators. More specifically, the adjustment can be associated with switching the antenna mode of the multi-mode antenna for the one or more network devices from a first antenna mode to a second antenna mode that is different than the first antenna mode to improve performance of the wireless network. Furthermore, if, as discussed above, the connectivity (e.g., link quality) of network equipment associated with the wireless network is below a threshold and can no longer be improved, the network controller can switch the antenna mode of the multi-mode antenna onboard one or more of the network devices from the first antenna mode to the second antenna mode so that the one or more network devices are no longer in communication with the network equipment. In this manner, the network equipment can be taken offline such that a maintenance action can be performed thereon.

Figure 1:
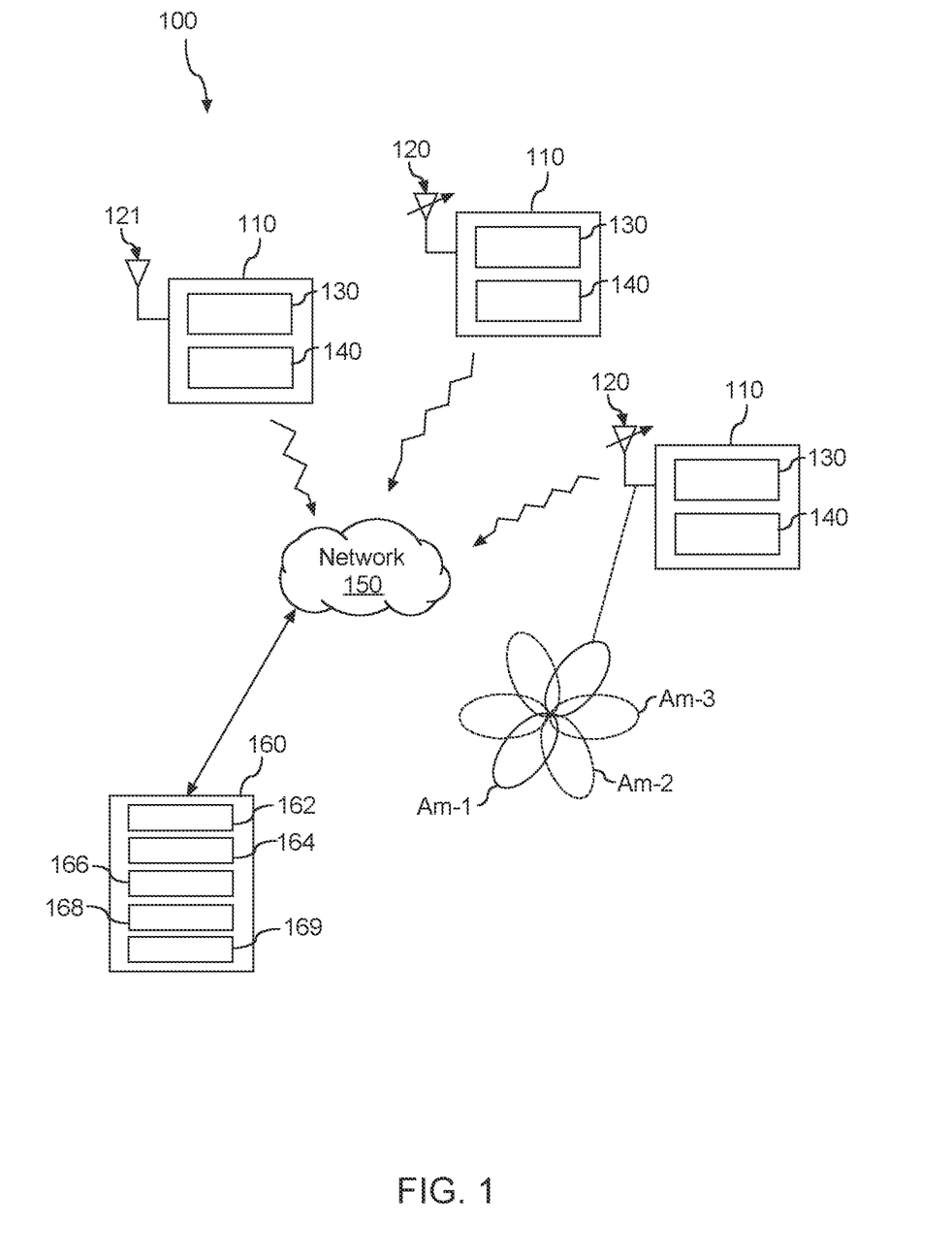
FIG. 1 depicts a system for configuring a multi-mode antenna based on network performance indicators for a wireless network according to example embodiments of the present disclosure.

Referring now to the FIGS., FIG. 1 depicts a system 100 for configuring a multi-mode antenna 120 based on network performance indicators for a wireless network 150. In some implementations, one or more of the network devices 110 can include, for instance, a mobile computing device (e.g., smartphone, laptop, tablet, wearable device). However, it should be understood that the plurality of network devices 110 can include any type of network device configured to communicate (e.g., transmit and/or receive) data over the wireless network 150.

As shown, one or more of the plurality of network devices 110 on the wireless network 150 can include the multi-mode antenna 120. Furthermore, in some implementations, one or more of the plurality of network devices 110 on the wireless network 150 can include an antenna 121 having a fixed radiation pattern.

In some implementations, the wireless network 150 can be a cellular network. In such implementations, one or more of the network devices 110 can include repeaters, small cells, femto cells, or any other cellular device configured to operate on the cellular network. It should be understood that the wireless network 150 can include any suitable type of wireless network configured to facilitate communication amongst the plurality of network devices 110. For instance, in some implementations, the wireless network 150 can include a wireless local area network (WLAN), such as a 802.11 network (e.g., WiFi network). In such implementations, one or more of the network devices 110 can include a gateway, a router, an extender, or any other suitable device configured to communicate on the 802.11 network. It should also be understood that the wireless network 150 can have any suitable topology. For instance, in some implementations, the wireless network 150 can be a mesh network.

The multi-mode antenna 120 can be configurable in a plurality of different antenna modes (e.g., Am-1, Am, 2, Am, 3, etc.). Each antenna mode of the plurality of antenna modes can be associated with a different radiation pattern and/or polarization. It should be understood that the one or more network devices 110 having the multi-modal antenna 120 can include any suitable number of multi-mode antennas 120. For instance, in some implementations, one or more of the network devices 110 can include two or more multi-mode antennas.

In some implementations, each of the plurality of network devices 110 can include one or more control devices 130. The one or more control devices 130 can be configured to control operation of the antennas 120, 121. For instance, the one or more control devices 130 of the one or more network devices 110 having the multi-modal antenna 120 can configure the multi-mode antenna 120 in each of the plurality of antenna modes. In this manner, the one or more control devices 130 can obtain data indicative of a channel quality indicator (CQI) for one or more antenna modes of the plurality of antenna modes (e.g., Am-1, Am-2, Am-3, etc.) in which the multi-mode antenna 120 is configurable.

In some implementations, the one or more control devices 130 can be configured to implement a software application (e.g., third-party software) stored on one or more memory devices (not shown) associated with the one or more control devices 130. The software application can be associated with monitoring performance of the wireless network 150. For instance, the one or more control devices 130 can execute the software application to detect violations of data limits set for the corresponding network device 110. By implementing the software application on each of the plurality of network devices 110, the software application can function closer to the hardware (e.g., multi-mode antenna 120) of the corresponding network device 110. In this manner, the software application can, for example, collect data (e.g., CQI for one or more antenna modes) that is more indicative of performance (e.g., health) of the corresponding network device 110.

In such implementations, each of the plurality of network devices 110 can include an application programming interface 140 to facilitate communication between the one or more control devices 130 and the software application. For instance, the application programming interface 140 can allow the one or more control devices 130 onboard the one or more network devices 110 having the multi-modal antenna 120 to obtain a request from the software application for the data indicative of the CQI for one or more antenna modes of the multi-mode antenna 120. Furthermore, in response to the request from the software application, the one or more control devices 130 can provide the data indicative of the CQI associated with the one or more antenna modes of the multi-mode antenna 120 to the software application via the application programming interface 140. It should be appreciated that the application programming interface 140 can be bidirectional. In this manner, data indicative of performance of the corresponding network device 110 as determined by the software application can be provided to the one or more control devices 130 via the application programming interface 140.

As shown, the system 100 can include a network controller 160. The network controller 160 can communicate with each of the plurality of network devices 110 over the wireless network 150. In this manner, the network controller 160 can obtain data from each of the plurality of network devices 110. For instance, in some implementations, the data the network controller 160 obtains from each of the plurality of network devices 110 can be indicative of the CQI associated with one or more antenna modes of the multi-mode antenna 120 onboard one or more of the network devices 110. Alternatively, or additionally, the data the network controller 160 obtains from each of the plurality of network devices 110 can include output data (e.g., performance of network device 110) of the software application implemented by the one or more control devices 130 onboard each of the plurality of network devices 110. In this manner, the network controller 160 can be configured to monitor a health of the wireless network 150 based, at least in part, on the data obtained from each of the plurality of network devices 110.

The network controller 160 can include one or more computing devices 162. The one or more computing devices 162 can include one or more processors and one or more memory devices. The processor(s) can include any suitable processing device, such as a microprocessor, microcontroller, integrated circuit, logic device, or other suitable processing device. The memory device(s) can include one or more computer-readable media, including, but not limited to, non-transitory computer-readable media, RAM, ROM, hard drives, flash drives, or other memory devices. The memory device(s) can store information accessible by the processor(s), including computer-readable instructions that can be executed by the processor(s). The computer-readable instructions can be any set of instructions that, when executed by the processor(s), cause the processor(s) to perform operations. The computer-readable instructions can be software written in any suitable programming language or may be implemented in hardware. In some embodiments, the computer-readable instructions can be executed by the processor(s) to cause the processor(s) to perform operations, which will now be discussed in more detail.

The one or more computing devices 162 can be configured to determine one or more network performance indicators for the wireless network 150 based, at least in part, on the data indicative of the CQI associated with one or more antenna modes of the plurality of antenna modes in which the multi-mode antenna 120 onboard one or more of the plurality of network devices 110 is configurable. In some implementations, the network controller 160 can include one or more machine-learned models 164. In such implementations, the one or more computing devices 162 can be configured to provide the data (e.g., CQI for one or more antenna modes of the multi-mode antenna 120) obtained from each of the plurality of network devices 110 as an input to the one or more machine-learned models 164. The one or more machine-learned models 164 can be configured to process the data indicative of the CQI to output the one or more network performance indicators for the wireless network 150. In some implementations, the network controller 160 can include a display screen 166. In this manner, the data the one or more machine-learned models 164 output can be provided for viewing via the display screen 166. Alternatively, or additionally, the data indicative of the CQI can be provided for viewing by the display screen 166 of the network controller 160.

It should be appreciated that the one or more machine-learned models 164 can include any suitable type of machine-learned model. For instance, the one or more machine-learned models 164 can include, without limitation, a random forest classifier; a logistic regression classifier; a support vector machine; one or more decision trees; a neural network; and or other types of machine-learned models, including both linear models and non-linear models. Example neural networks can include feed-forward neural networks, recurrent neural networks (e.g., long short-term memory recurrent neural networks), or other forms of neural networks.

In some implementations, the one or more machine-learned models 164 can be trained through use of a model trainer 168. The model trainer 168 can train the one or more machine-learned models 164 using one or more training or learning algorithms. One example training technique is backwards propagation of errors ("backpropagation"). For example, backpropagation can include Levenberg-Marquardt backpropagation. In some implementations, the model trainer 168 can perform supervised training techniques using a set of labeled training data. In other implementations, the model trainer 168 can perform unsupervised training techniques using a set of unlabeled training data. The model trainer 168 can perform a number of generalization techniques to improve the generalization capability of the models being trained. Generalization techniques include weight decays, dropouts, or other techniques. In particular, the model trainer 168 can train the one or more machine-learned models 164 based on a set of training data 169. The training data 169 can includes a number of training examples. Each training example can include an instance of data indicative of CQI for one or more of the antenna modes of the plurality of antenna modes in which the multi-mode antenna 120 can be configured.

In some implementations, the one or more computing devices 162 can be configured to perform one or more control actions based, at least in part, on the network performance indicators for the wireless network 150. For example, the one or more computing devices 162 can determine one or more adjustments to the multi-mode antenna 120 onboard one or more of the network devices 110 based, at least in part, on the one or more network performance indicators. In some implementations, the one or more control actions can include providing one or more control signals associating with adjusting an antenna mode for the multi-mode antenna 120 of the one or more network devices 110. For instance, the one or more control signals can be associated with switching the multi-mode antenna 120 of the one or more network devices 110 from operating in a first antenna mode to operating in a second antenna mode that is different than the first antenna mode to improve performance of the wireless network 150.

It should be appreciated that examples of data indicative of the channel quality indicator associated with one or more of the antenna modes of the multi-mode antenna 120 can include a receive signal strength indicator (RSSI), a signal-to-noise ratio (SNR), a signal-to-interference-plus noise ratio (SINR), a magnitude error ratio (MER), an error vector magnitude (EVM), a bit error rate (BER), a block error rate (BLER), a packet error rate (PER), or combinations of the foregoing, and/or various other metrics.

In some implementations, the one or more computing devices 162 can be configured to assign each of the plurality of network devices 110 to one or more classes. Furthermore, in some implementations, the one or more computing devices 162 can be configured to set a priority for each of the classes. For instance, a first group of the network devices 110 can be assigned to a first class having a first priority, whereas a second group of the network devices 110 can be assigned to a second class having a second priority that is different than the first priority. For instance, in some implementations, the second priority can be lower than the first priority. In alternative implementations, the second priority can be higher than the first priority. In some implementations, the one or more computing devices 162 can be configured to determine a priority of a communication link between a first network device of the plurality of network devices 110 and at least a second network device of the plurality of network devices 110 based, at least in part, on a type of data to be transmitted via the communication link. It should be understood that priority of the communication link between the first network device and at least the second network device can be determined based on other parameters besides the type of data to be transmitted over the communication link.

Figure 2:
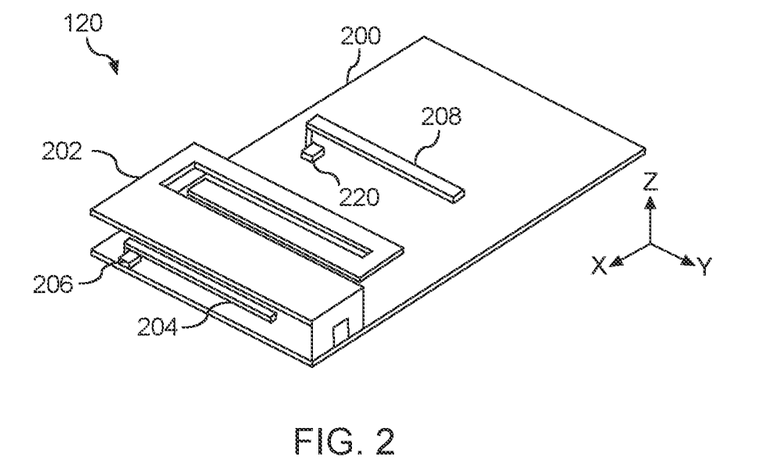
FIG. 2 depicts a multi-mode antenna according to example embodiments of the present disclosure.

FIG. 2 illustrates an example multi-mode antenna 120 according to the present disclosure. As shown, the multi-mode antenna 120 can include a circuit board 200 (e.g., including a ground plane) and a driven antenna element 202 disposed on the circuit board 200. An antenna volume may be defined between the circuit board 200 (e.g., and the ground plane) and the driven antenna element 202. The multi-mode antenna 120 can include a first parasitic element 204 positioned at least partially within the antenna volume. The multi-mode antenna 120 can further include a first tuning element 206 coupled with the first parasitic element 204. The first tuning element 206 can be a passive or active component or series of components and can be configured to alter a reactance on the first parasitic element 204 either by way of a variable reactance or shorting to ground. It should be appreciated that altering the reactance of the first parasitic element 204 can result in a frequency shift of the multi-mode antenna 120. It should also be appreciated that the first tuning element 206 can include at least one of a tunable capacitor, MEMS device, tunable inductor, switch, a tunable phase shifter, a field-effect transistor, or a diode.

In some implementations, the multi-mode antenna 120 can include a second parasitic element 208 disposed adjacent the driven antenna element 202 and outside of the antenna volume. The multi-mode antenna 120 can further include a second tuning element 220. In some implementations, the second tuning element 220 can be a passive or active component or series of components and may be configured to alter a reactance on the second parasitic element 208 by way of a variable reactance or shorting to ground. It should be appreciated that altering the reactance of the second parasitic element 208 result in a frequency shift of the multi-mode antenna 120. It should also be appreciated that the second tuning element 220 can include at least one of a tunable capacitor, MEMS device, tunable inductor, switch, a tunable phase shifter, a field-effect transistor, or a diode.

In some implementations, operation of at least one of the first tuning element 206 and the second tuning element 220 can be controlled to adjust (e.g., shift) the antenna radiation pattern of the driven antenna element 202. For example, a reactance of at least one of the first tuning element 206 and the second tuning element 220 can be controlled to adjust the antenna radiation pattern of the driven antenna element 202. Adjusting the antenna radiation pattern can be referred to as "beam steering". However, in instances where the antenna radiation pattern includes a null, a similar operation, commonly referred to as "null steering", can be performed to shift the null to an alternative position about the driven antenna element 202 (e.g., to reduce interference).

Figure 3:
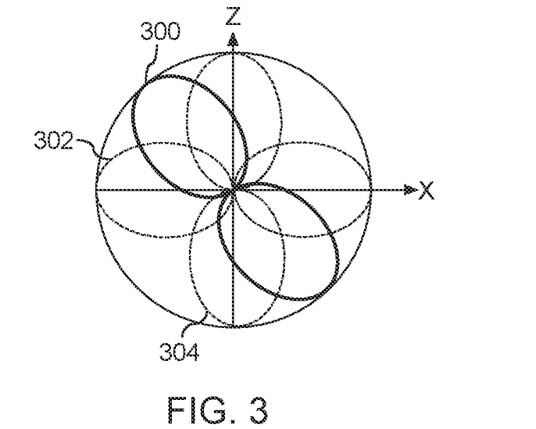
FIG. 3 depicts a two-dimensional radiation pattern associated with a multi-mode antenna according to example embodiments of the present disclosure.

FIG. 3 depicts antenna radiation patterns associated with the multi-mode antenna 120 of FIG. 1 according to example embodiments of the present disclosure. It should be appreciated that operation of at least one of the first parasitic element 204 and the second parasitic element 208 can be controlled to configure the multi-mode antenna 120 in a plurality of modes. It should also be appreciated that the multi-mode antenna 120 can have a distinct antenna radiation pattern or antenna polarization when configured in each of the plurality of modes.

In some implementations, the multi-mode antenna 120 can have a first antenna radiation pattern 300 when the multi-mode antenna 120 is configured in a first mode of the plurality of modes. In addition, the multi-mode antenna 120 can have a second antenna radiation pattern 302 when the multi-mode antenna 120 is configured in a second mode of the plurality of modes. Furthermore, the multi-mode antenna 120 can have a third antenna radiation pattern 304 when the multi-mode antenna 120 is configured in a third mode of the plurality of modes. As shown, the first antenna radiation pattern 300, the second antenna radiation pattern 302, and the third antenna radiation pattern 304 can be distinct from one another. In this manner, the multi-mode antenna 120 can have a distinct radiation pattern when configured in each of the first mode, second mode, and third mode.

Figure 4:
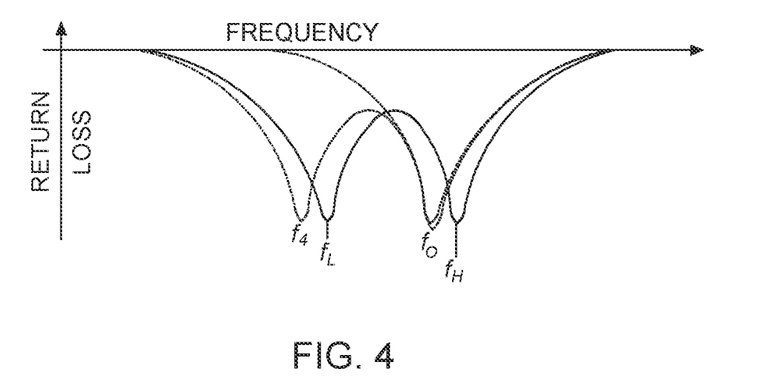
FIG. 4 depicts a frequency plot of a multi-mode antenna according to example embodiments of the present disclosure.

FIG. 4 depicts an example frequency plot of the multi-mode antenna 120 of FIG. 1 according to some aspects of the present disclosure. It should be understood that an electrical characteristic (e.g., reactance) of at least one of the first parasitic element 204 and the second parasitic element 208 can be controlled. In this manner, the electrical characteristic of at least one of the first parasitic element 204 and the second parasitic element 208 can be adjusted to shift a frequency at which the corresponding multi-mode antenna is operating.

In some implementations, the multi-mode antenna 120 can be tuned to a first frequency $f_0$ when the first parasitic element 204 and the second parasitic element 208 are deactivated (e.g., switched off). Alternatively and/or additionally, the multi-mode antenna 120 can be tuned to frequencies $f_L$ and $f_H$ when the second parasitic element 208 is shorted to ground. Furthermore, the multi-mode antenna 120 can be tuned to frequency $f_4$ when both the first parasitic element 204 and the second parasitic element 208 are shorted to ground. Still further, the multi-mode antenna 120 can be tuned to frequencies $f_4$ and $f_0$ when the first parasitic element 204 and the second parasitic element 208 are each shorted to ground. It should be understood that other configurations are within the scope of this disclosure. For example, more or fewer parasitic elements may be employed. The positioning of the parasitic elements may be altered to achieve additional modes that may exhibit different frequencies and/or combinations of frequencies.

FIGS. 2-4 depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein a "modal antenna" refers to an antenna capable of operating in a plurality of modes where each mode is associated with a distinct radiation pattern.

Figure 5:
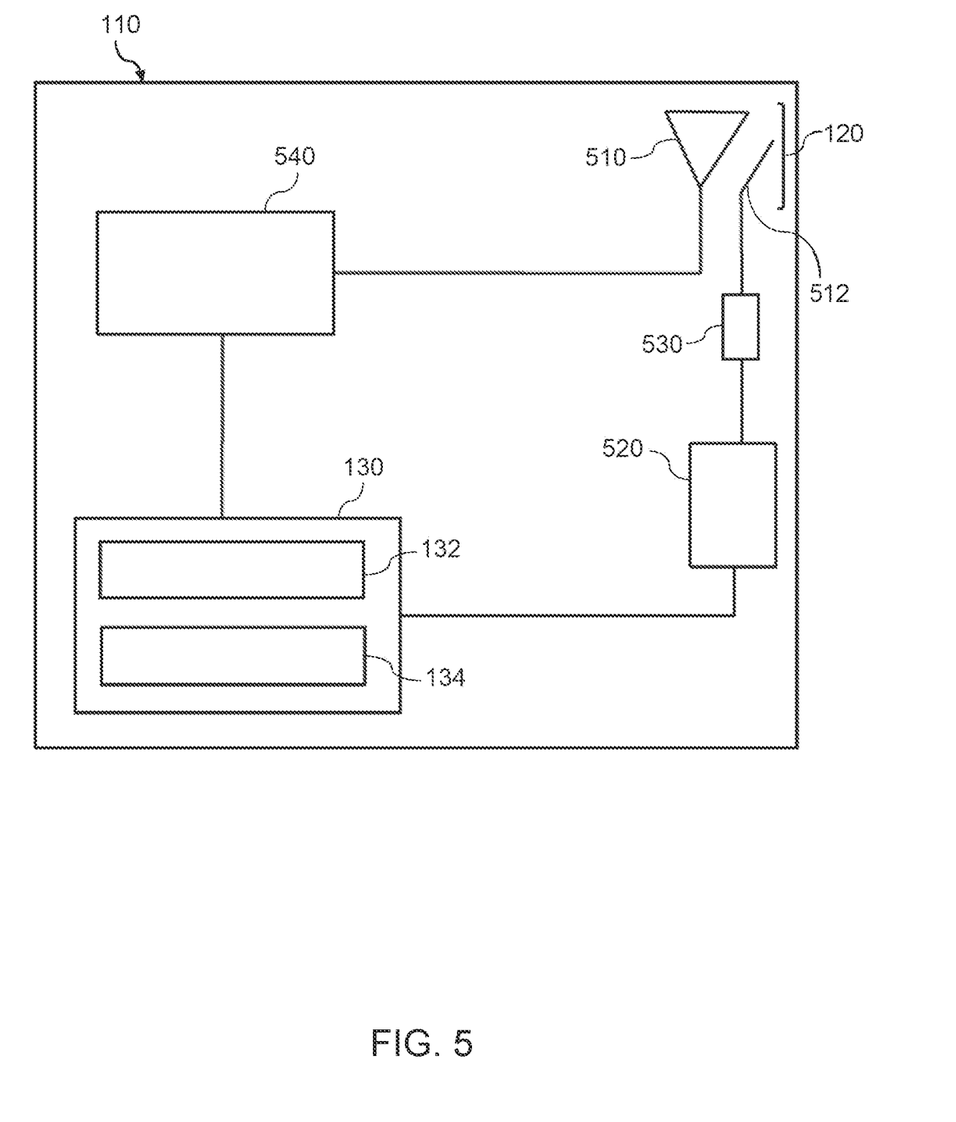
FIG. 5 depicts a block diagram of components of a network device according to example embodiments of the present disclosure.

Referring now to FIG. 5, an example embodiment of a network device of the plurality of network devices 110 discussed above with reference to FIG. 1 is provided. As shown, the multi-mode antenna 120 can include a driven element 510 and a parasitic element 512. The multi-mode antenna 120 can, as discussed above, be operable in a plurality of different modes. Each mode of the plurality of modes can be associated with a different radiation pattern and/or polarization characteristics, for instance, as described above with reference to FIGS. 2-4. Furthermore, although the network device 110 is depicted as having only one multi-mode antenna 120, it should be appreciated that the network device 110 can include any suitable number of multi-mode antennas. For instance, in some implementations, the network device 110 can include two or more multi-mode antennas.

The network device 110 can include a tuning circuit 520 configured to control an electrical characteristic associated with the parasitic element 512 to operate the multi-mode antenna 120 in the plurality of different modes. In some implementations, the network device 110 can include a tunable component 530. As shown, the tunable component 530 can be coupled between the parasitic element 512 and the tuning circuit 520. The tuning circuit 520 can be configured to control operation of the tunable component 530 to alter the electrical connectivity of the parasitic element 512 with a voltage or current source or sink, such as coupling the parasitic element 512 to an electrical ground.

The network device 110 can include RF circuitry 540. In some implementations, the RF circuitry 540 can include a front end module. The front end module can include, for instance, one or more power amplifiers, low noise amplifiers, impedance matching circuits, etc. In this manner, the front end module can be configured to amplify the RF signal that is transmitted to and/or received from the driven element 510 of the multi-mode antenna 120.

In some implementations, the one or more control devices 130 of the network device 110 can be operatively coupled to the tuning circuit 520. In this manner, the one or more control devices 130 can be configured to control operation of the tuning circuit 520 to configure the multi-mode antenna 120 in the plurality of different modes. Alternatively and/or additionally, the one or more control devices 130 can be in electrical communication with the RF circuitry 540. In this manner, RF signals received at the multi-mode antenna 120 can be provided to the one or more control devices 130 via the RF circuitry 540. In addition, the one or more control devices 130 can provide data to be modulated onto a transmit RF signal provided to the driven element 510 of the multi-mode antenna 120 via the RF circuitry 540.

As shown, the one or more control devices 130 can include one or more processors 132 and one or more memory devices 134. The processor(s) 132 can include any suitable processing device, such as a microprocessor, microcontroller, integrated circuit, logic device, or other suitable processing device. The memory device(s) 134 can include one or more computer-readable media, including, but not limited to, non-transitory computer-readable media, RAM, ROM, hard drives, flash drives, or other memory devices.

The memory device(s) 134 can store information accessible by the processor(s) 132, including computer-readable instructions that can be executed by the processor(s) 132. The computer-readable instructions can be any set of instructions that, when executed by the processor(s) 132, cause the processor(s) 132 to perform operations. The computer-readable instructions can be software written in any suitable programming language or may be implemented in hardware. In some embodiments, the computer-readable instructions can be executed by the processor(s) 132 to cause the processor(s) 132 to perform operations, which will now be discussed in more detail.

Figure 6:
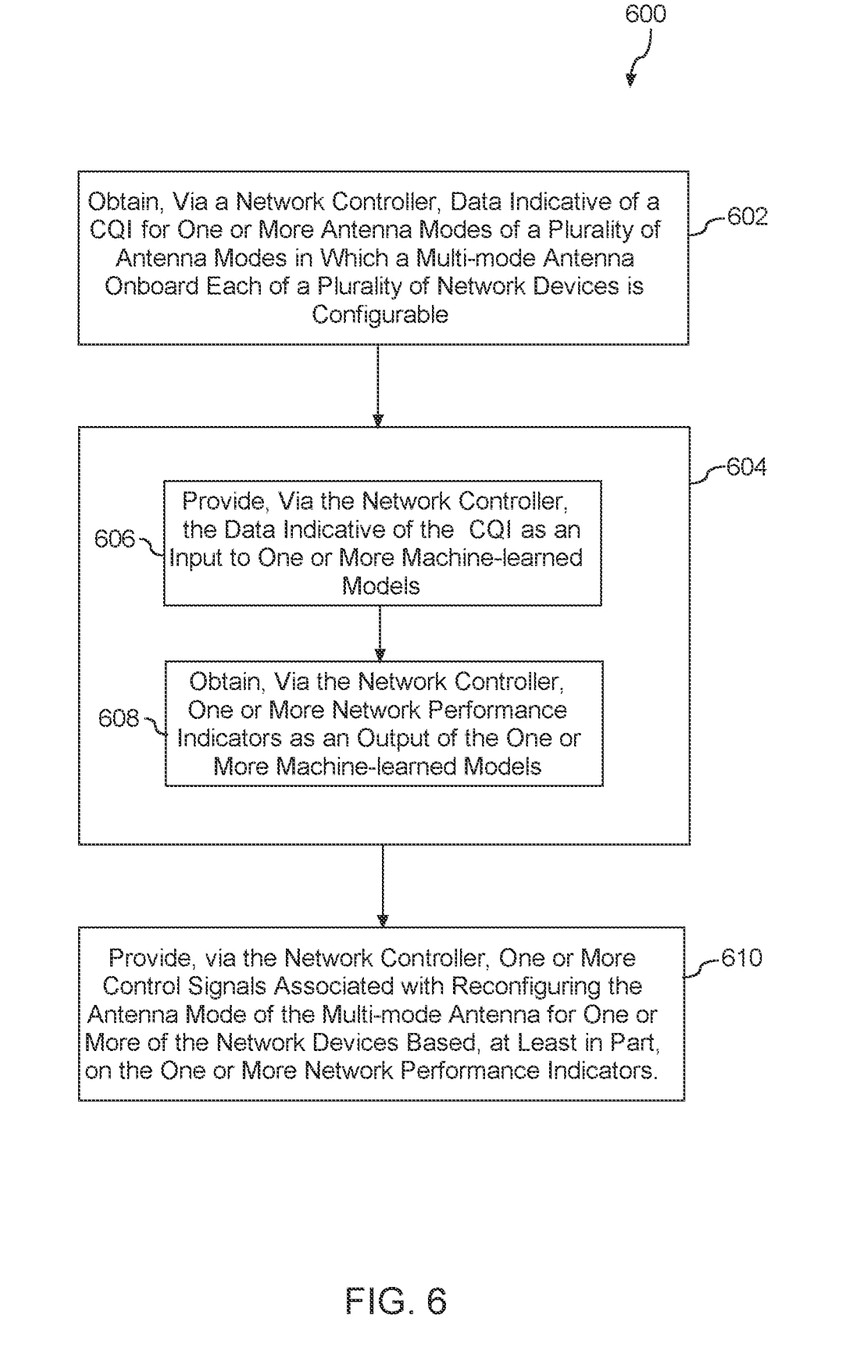
FIG. 6 depicts a flow diagram of a method for configuring a multi-mode antenna based on network performance indicators for a wireless network according to example embodiments of the present disclosure.

Referring now to FIG. 6, a flow diagram of a method 600 for configuring a multi-mode antenna onboard one or more of a plurality of network devices on a wireless network is provided according to example embodiments of the present disclosure. In general, the method 600 will be discussed herein with reference to the system 100 described above with reference to FIG. 1. In addition, although FIG. 6 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (602), the method 600 includes obtaining, via a network controller, data from one or more network devices having a multi-modal antenna. For instance, in some implementations, the data can be indicative of a channel quality indicator (CQI) associated with one or more antenna modes of a plurality of antenna modes in which the multi-mode antenna is configurable. It should be appreciated that the data indicative of the channel quality indicator associated with one or more of the antenna modes of the multi-mode antenna can include a receive signal strength indicator (RSSI), a signal-to-noise ratio (SNR), a signal-to-interference-plus noise ratio (SINR), a magnitude error ratio (MER), an error vector magnitude (EVM), a bit error rate (BER), a block error rate (BLER), a packet error rate (PER), or combinations of the foregoing, and/or various other metrics.

In alternative implementations, the data indicative of the CQI can be provided as an input to a model (e.g., third-party software application) executing on a control device of the one or more network devices having the multi-modal antenna. The model can process the data indicative of the CQI to obtain data indicative of performance (e.g., health) of the corresponding network device. In such implementations, the data obtained from the one or more devices having the multi-modal antenna can include the output of the model executing on the control device. More specifically, the output of the model can include the data indicative of performance of the corresponding network device.

At (604), the method 600 includes determining, via the network controller, one or more network performance indicators for the wireless network based, at least in part, on the data obtained at (602). For instance, in some implementations, determining one or more network performance indicators for the wireless network can include, at (606), providing the data as an input to one or more machine-learned models. For example, the data indicative of the CQI for the one or more antenna modes of the multi-mode antenna can be provided as an input to the one or more machine-learned models. Alternatively, or additionally, the data output by the model executing on the control device of the one or more network devices can be provided as an input to the one or more machine-learned models. The one or more machine-learned models can process the data and, at (608), the method 600 can include obtaining the one or more network performance indicators as an output of the one or more machine-learned models.

At (610), the method 600 includes providing, by the network controller, one or more control signals to one or more of the network devices based, at least in part, on the one or more network performance indicators determined at (604). The one or more control signals can be associated with reconfiguring the antenna mode of the multi-mode antenna. More specifically, the one or more control signals can be associated with switching the antenna mode of the multi-mode antenna from a first antenna mode of the plurality of antenna modes to a second antenna mode of the plurality of antenna modes. In this manner, the radiation pattern of the multi-mode antenna for the one or more network devices can be steered based, at least in part, on the one or more network performance indicators determined at (604) to improve performance of the communication network.

Figure 7:
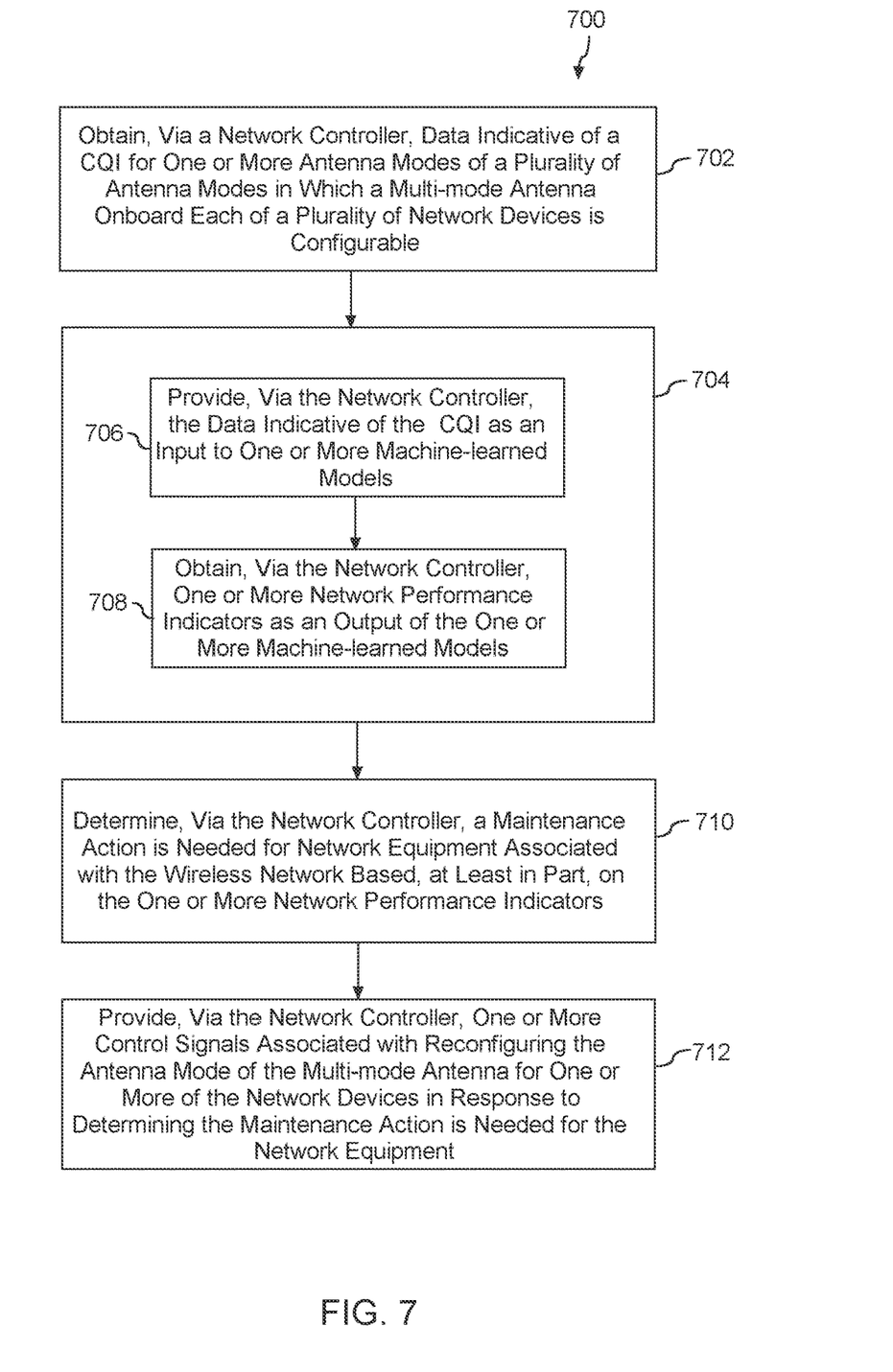
FIG. 7 depict a flow diagram of another method for configuring a multi-mode antenna based on network performance indicators for a wireless network according to example embodiments of the present disclosure.

Referring now to FIG. 7, another flow diagram of a method 700 for configuring a multi-mode antenna onboard each of a plurality of network devices on a wireless network is provided according to example embodiments of the present disclosure. In general, the method 700 will be discussed herein with reference to the system 100 described above with reference to FIG. 1. In addition, although FIG. 7 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (702), the method 700 includes obtaining, via a network controller, data from one or more network devices having a multi-modal antenna. More specifically, the data can be indicative of a channel quality indicator (CQI) associated with one or more antenna modes of a plurality of antenna modes in which the multi-mode antenna is configurable. It should be appreciated that the data indicative of the channel quality indicator associated with one or more of the antenna modes of the multi-mode antenna can include a receive signal strength indicator (RSSI), a signal-to-noise ratio (SNR), a signal-to-interference-plus noise ratio (SINR), a magnitude error ratio (MER), an error vector magnitude (EVM), a bit error rate (BER), a block error rate (BLER), a packet error rate (PER), or combinations of the foregoing, and/or various other metrics.

In alternative implementations, the data indicative of the CQI can be provided as an input to a model (e.g., third-party software application) executing on a control device of the one or more network devices having the multi-modal antenna. The model can process the data indicative of the CQI to obtain data indicative of performance (e.g., health) of the corresponding network device. In such implementations, the data obtained from the one or more devices having the multi-modal antenna can include the output of the model executing on the control device. More specifically, the output of the modal can include the data indicative of performance of the corresponding network device.

At (704), the method 700 includes determining, via the network controller, one or more network performance indicators for the wireless network based, at least in part, on the data obtained from each of the plurality of network devices at (702). For instance, in some implementations, the method 700 includes, at (706), providing the data obtained at (702) as an input to one or more machine-learned models. For example, the data indicative of the CQI for the one or more antenna modes of the multi-mode antenna onboard each of the plurality of network devices can be provided as an input to the one or more machine-learned models. Alternatively, or additionally, the data output by the model executing on the control device of the one or more network devices can be provided as an input to the one or more machine-learned models The one or more machine-learned models can process the data and, at (708), the method 700 can include obtaining the one or more network performance indicators as an output of the one or more machine-learned models.

At (710), the method 700 includes determining, via the network controller, a maintenance action needs to be performed on network equipment (e.g., access point, network switches, bridge, router, repeater, cabling, network controller, etc.) associated with the wireless network. For instance, the one or more network performance indicators determined at (704) for the wireless network can include one or more signals indicative of the maintenance action for the network equipment.

At (712), the method 700 includes providing, via the network controller, one or more control signals associated with reconfiguring the antenna mode of the multi-mode antenna for one or more of the network devices in response to determining the maintenance action is needed for the network equipment at (710). For instance, in some implementations, the one or more control signals can be associated with the switching the antenna mode of the multi-mode antenna onboard the one or more network devices from a first antenna mode in which the multi-mode antenna can communicate with the network equipment for which the maintenance action is needed to a second antenna mode in which the multi-mode antenna cannot communicate with the network equipment. In this manner, network traffic can be rerouted to avoid the network equipment such that a degradation in performance of the wireless network can be avoided.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for configuring a multi-mode antenna onboard one or more of a plurality of network devices on a wireless network, the system comprising:
   one or more processors; and
   one or more memory devices storing computer-readable instructions that, when executed by the one or more processors, cause the one or more processors to perform operations, the operations comprising:
      obtaining data indicative of a channel quality indicator (CQI) associated with one or more antenna modes of a plurality of antenna modes in which the multi-mode antenna onboard one or more of the network devices is configurable, each of the plurality of antenna modes having a distinct radiation pattern;
      determining one or more network performance indicators for the wireless network based, at least in part, on the data; and
      providing one or more control signals over the wireless network based, at least in part, on the one or more network performance indicators for the wireless network, the one or more control signals associated with reconfiguring an antenna mode of the multi-mode antenna onboard one or more of the network devices.

2. The system of claim 1, wherein determining one or more network performance indicators comprises:
   providing the data indicative of the CQI associated with the one or more antenna modes as an input to a machine-learned model; and
   obtaining the one or more network performance indicators as an output of the machine-learned model.

3. The system of claim 1, wherein the data indicative of the CQI comprises at least one of a receive signal strength indicator (RSSI), signal-to-noise ratio (SNR) or signal-to-interference-plus noise ratio (SINR).

4. The system of claim 1, wherein the one or more control signals are associated with switching the antenna mode of the multi-mode antenna from a first antenna mode of the plurality of antenna modes to a second antenna mode of the plurality of antenna modes.

5. The system of claim 1, wherein the one or more network performance indicators for the wireless network comprises at least one of an uplink speed for each of the network devices or a downlink speed for each of the network devices.

6. The system of claim 1, wherein the one or more network performance indicators for the wireless network comprise data indicative of an amount of traffic on the wireless network.

7. The system of claim 1, wherein the one or more network performance indicators comprise a signal indicative of a maintenance action associated with network equipment of the wireless network.

8. The system of claim 7, wherein the one or more control signals are associated within reconfiguring the antenna mode of the multi-mode antenna from a first antenna mode in which the multi-mode antenna is in communication with the network equipment to a second antenna mode in which the multi-mode antenna is not in communication with the network equipment.

9. The system of claim 7, wherein the network equipment comprises at least one of an access point, a bridge, a hub, a router, or cabling.

10. The system of claim 1, wherein the wireless network comprises a cellular network.

11. The system of claim 1, wherein the wireless network comprises a 802.11 network.

12. The system of claim 1, wherein determining one or more network performance indicators for the network comprises:
providing the data indicative of the CQI as an input to a model;
obtaining data indicative of performance of the one or more network devices as an output of the model; and
determining the one or more network performance indicators for the wireless network based, at least in part, on the output of the model.

13. A method for configuring a multi-mode antenna onboard one or more of a plurality of network devices on a wireless network, the method comprising:
obtaining, via a network controller of the wireless network, data indicative of a channel quality indicator (CQI) associated with one or more antenna modes of a plurality of antenna modes in which the multi-mode antenna onboard one or more of the network devices is configurable, each of the plurality of antenna modes having a distinct radiation pattern;
determining, via the network controller, one or more network performance indicators for the wireless network based, at least in part, on the data; and
providing, via the network controller, one or more control signals over the wireless network based, at least in part, on the one or more network performance indicators for the wireless network, the one or more control signals associated with reconfiguring an antenna mode of the multi-mode antenna onboard at least one of the plurality of network devices.

14. The method of claim 13, wherein determining one or more network performance indicators for the wireless network comprises:
providing, via the network controller, the data indicative of the CQI associated with the one or more antenna modes as an input to a machine-learned model;
obtaining, via the network controller, the one or more network performance indicators as an output of the machine-learned model.

15. The method of claim 13, wherein the one or more network performance indicators comprise a signal indicative of a maintenance action associated with network equipment of the wireless network.

16. The method of claim 15, wherein the one or more control signals are associated within reconfiguring the antenna mode of the multi-mode antenna for at least one of the plurality of network devices from a first antenna mode in which the multi-mode antenna is in communication with the network equipment to a second antenna mode in which the multi-mode antenna is not in communication with the network equipment.

17. The method of claim 13, wherein the wireless network comprises a mesh network.

18. A computing device comprising:
a multi-mode antenna configurable to operate in a plurality of antenna modes, each antenna mode of the plurality of antenna modes having a distinct radiation pattern; and
one or more control devices configured to:
configure the multi-mode antenna in each of the plurality of antenna modes;
obtain data indicative of a channel quality indicator (CQI) while the multi-mode antenna is configured in each of the plurality of antenna modes;
provide, via a wireless network, data indicative of the CQI for one or more of the antenna modes to a network controller;
obtain, via the wireless network, one or more control signals from the network controller, the one or more control signals associated with configuring the multi-mode antenna in a selected antenna mode of the plurality of antenna modes based, at least in part, on one or more network performance indicators for the wireless network that the network controller determined based, at least in part, on the data indicative of the CQI for the one or more antenna modes; and
configure the multi-mode antenna in the selected antenna mode.

19. The computing device of claim 18, wherein the one or more control devices are configured to provide data indicative of the CQI for each of the plurality of antenna modes.

20. The computing device of claim 18, wherein the one or more network performance indicators comprise a signal indicative of a maintenance action associated with network equipment of the wireless network.

* * * * *